US008977708B2

(12) United States Patent
Kewalramani et al.

(10) Patent No.: US 8,977,708 B2
(45) Date of Patent: *Mar. 10, 2015

(54) MOBILE WIRELESS COMMUNICATIONS DEVICE PROVIDING ENHANCED FILE TRANSFER MANAGEMENT FEATURES AND RELATED METHODS

(71) Applicant: BlackBerry Limited, Waterloo (CA)

(72) Inventors: Vikram Kewalramani, Waterloo (CA); Arun Kumar, Waterloo (CA); Michael Thomas Winkler, Hanover, PA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,964

(22) Filed: Jul. 31, 2013

(65) Prior Publication Data

US 2013/0316683 A1    Nov. 28, 2013

Related U.S. Application Data

(63) Continuation of application No. 13/070,734, filed on Mar. 24, 2011, now Pat. No. 8,521,836.

(60) Provisional application No. 61/327,924, filed on Apr. 26, 2010.

(51) Int. Cl.
*G06F 15/16* (2006.01)
*H04W 4/16* (2009.01)
(Continued)

(52) U.S. Cl.
CPC .............. *H04W 4/16* (2013.01); *H04L 67/06* (2013.01); *H04M 1/72522* (2013.01)
USPC ........................................ 709/217

(58) Field of Classification Search
CPC ................................ H04L 67/02; H04L 67/06
USPC .................................. 709/217–219, 245–246
See application file for complete search history.

(56) References Cited

U.S. PATENT DOCUMENTS

| 7,293,099 B1 | 11/2007 | Kalajan |
| 2007/0209005 A1 | 9/2007 | Shaver et al. |

(Continued)

FOREIGN PATENT DOCUMENTS

| EP | 2031913 | 3/2009 |
| EP | 2045968 | 4/2009 |

OTHER PUBLICATIONS

"DM Mobile description", http://handheld.softpedia.com/get/Download-manager/DM-Mobile-87129.shtml, printed Apr. 19, 2010, 1 pg.

(Continued)

*Primary Examiner* — Chirag R Patel
(74) *Attorney, Agent, or Firm* — Allen, Dyer, Doppelt, Milbrath & Gilchrist, P.A.

(57) ABSTRACT

A mobile wireless communications device may include a portable housing, at least one wireless transceiver carried by the portable housing, and a controller carried by the portable housing and coupled to the at least one wireless transceiver. The controller may be configured to operate a plurality of different mobile device applications for processing different electronic file types and generating download electronic file transfer requests and upload electronic file transfer requests, download requested electronic files for the plurality of different device applications via the at least one wireless transceiver using a common file transfer application responsive to the download electronic file transfer requests, and upload requested electronic files for the plurality of different device applications via the at least one wireless transceiver using the common file transfer application responsive to the upload electronic file transfer requests.

14 Claims, 6 Drawing Sheets

(51) Int. Cl.
*H04L 29/08* (2006.01)
*H04M 1/725* (2006.01)

(56) References Cited

U.S. PATENT DOCUMENTS

2007/0214263 A1 9/2007 Fraisse et al.
2007/0260691 A1 11/2007 Kallqvist et al.
2008/0189293 A1 8/2008 Strandel et al.
2009/0037515 A1 2/2009 Zapata et al.

OTHER PUBLICATIONS

"Firefox Features: Bringing together all kinds of awesomeness to make browsing better for you", http://www.mozilla.com/en-US/firefox/features/, printed Apr. 15, 2010, pp. 1-10.
"Mobile Download Accelerator Description", http://handheld.softpedia.com/get/Download-manager/Mobile-Download-Accelerator-74372.shtml, printed Apr. 19, 2010, 1 pg.

MOBILE WIRELESS COMMUNICATIONS DEVICE PROVIDING ENHANCED FILE TRANSFER MANAGEMENT FEATURES AND RELATED METHODS

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

DETAILED DESCRIPTION

Figure 1:
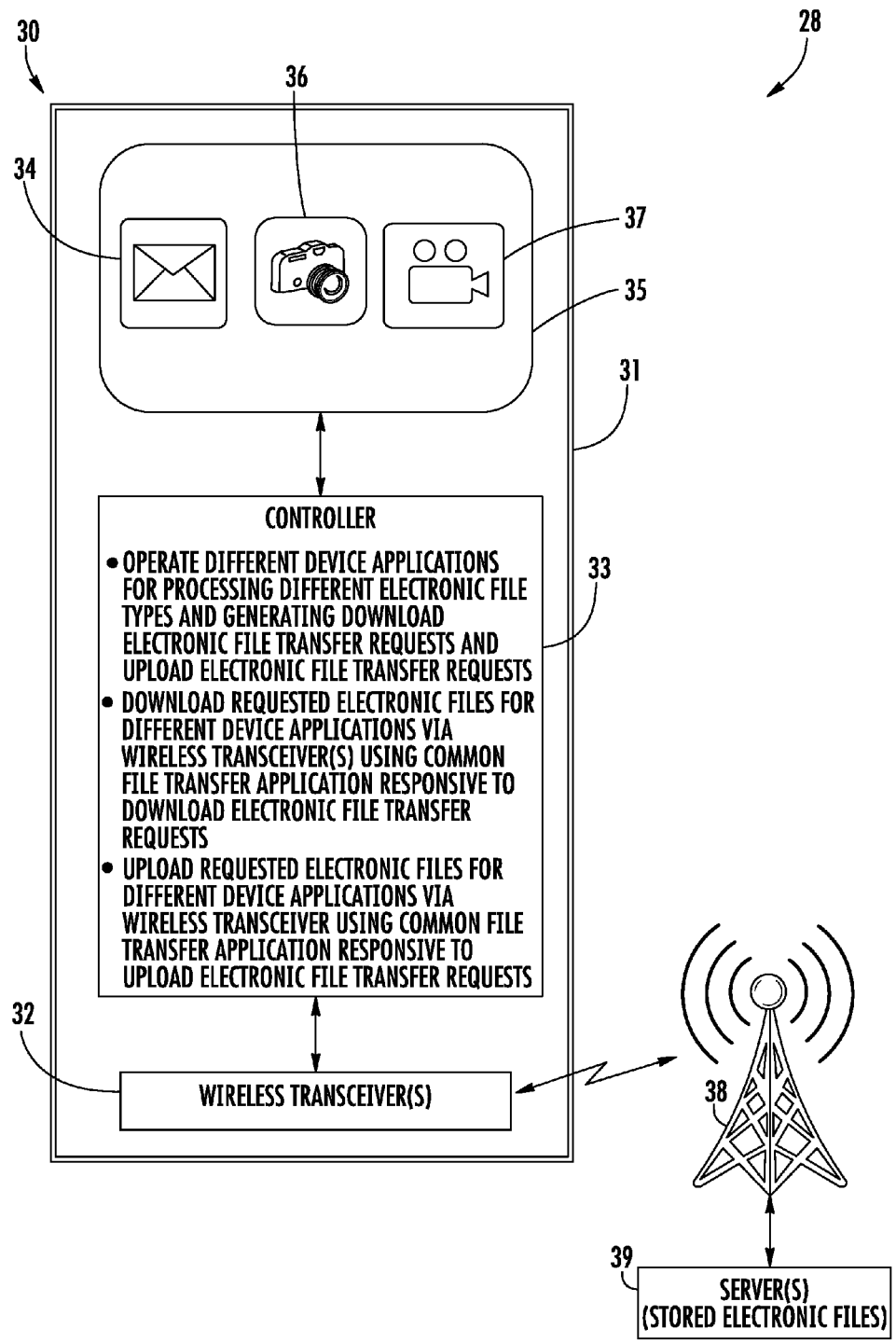
FIG. 1 is schematic block diagram of a communications system including a mobile wireless communications device in accordance with an exemplary embodiment.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Generally speaking, a mobile wireless communications device is provided herein which may include a portable housing, at least one wireless transceiver carried by the portable housing, and a controller carried by the portable housing and coupled to the at least one wireless transceiver. The controller may be configured to operate a plurality of different mobile device applications for processing different electronic file types and generating download electronic file transfer requests and upload electronic file transfer requests, download requested electronic files for the plurality of different device applications via the at least one wireless transceiver using a common file transfer application responsive to the download electronic file transfer requests, and upload requested electronic files for the plurality of different device applications via the at least one wireless transceiver using the common file transfer application responsive to the upload electronic file transfer requests. As such, the common file transfer application may therefore provide a file transfer manager to check the status and history of both downloads and uploads for numerous other applications, as well as providing a standardized approach for different applications to access respective download and upload files.

More particularly, the controller may be further configured to receive at least one file transfer filter via the at least one wireless transceiver from at least one wireless communications network, and prohibit at least one of upload and download of requested electronic files based upon the at least one file transfer filter. The controller may be further configured to group downloaded electronic files into different file folders.

In addition, the at least one wireless transceiver may comprise a plurality thereof configured to communicate using respective different wireless communication formats over different wireless communications networks having different communication bandwidths associated therewith. As such, the controller may be configured to select a desired wireless communication format for at least one of upload and download of requested electronic files based upon availability of the different wireless communications networks. The mobile wireless communications device may further include a display carried by the portable housing and coupled to the controller.

A related method is for using a mobile wireless communications device, such as the one described briefly above. The method may include operating a plurality of different device applications for processing different electronic file types and generating download electronic file transfer requests and upload electronic file transfer requests, downloading requested electronic files for the plurality of different device applications via the at least one wireless transceiver using a common file transfer application responsive to the download electronic file transfer requests, and uploading requested electronic files for the plurality of different device applications via the at least one wireless transceiver using the common file transfer application responsive to the upload electronic file transfer requests.

Another related method for using a mobile wireless communications device may include receiving at least one file transfer filter via the at least one wireless transceiver from at least one wireless communications network, and operating a plurality of different device applications for processing different electronic file types and generating download electronic file transfer requests. The method may further include selectively downloading requested electronic files for the plurality of different device applications via the at least one wireless transceiver using a common file transfer application responsive to the download electronic file transfer requests and based upon the at least one file transfer filter.

A related communications system may include at least one server for storing electronic files, and at least one mobile wireless communications device comprising a portable housing, at least one wireless transceiver carried by the portable housing, and a controller carried by the portable housing and coupled to the at least one wireless transceiver. The controller may be configured to operate a plurality of different mobile device applications for processing different electronic file types and generating download electronic file transfer requests and upload electronic file transfer requests. The controller may also be configured to download requested electronic files for the plurality of different mobile device applications from the at least one server via the at least one wireless transceiver using a common file transfer application responsive to the download electronic file transfer requests, and upload requested electronic files for the plurality of different mobile device applications to the at least one server via the at least one wireless transceiver using the common file transfer application responsive to the upload electronic file transfer requests.

Another related communications system may include at least one server for storing electronic files, and at least one mobile wireless communications device comprising a portable housing, at least one wireless transceiver carried by the portable housing, and a controller carried by the portable housing and coupled to the at least one wireless transceiver. The controller may be configured to receive at least one file transfer filter via the at least one wireless transceiver from at least one wireless communications network, and operate a plurality of different mobile device applications for processing different electronic file types and generating download electronic file transfer requests. The controller may be further configured to selectively download requested electronic files for the plurality of different mobile device applications from the at least one server via the at least one wireless transceiver using a common file transfer application responsive to the download electronic file transfer requests and based upon the at least one file transfer filter.

A related non-transitory computer-readable medium may have computer-executable instructions for causing a mobile wireless communications device comprising a portable housing and at least one wireless transceiver carried by the portable housing to perform steps comprising operating a plurality of different mobile device applications for processing different electronic file types and generating download electronic file transfer requests and upload electronic file transfer requests, and downloading requested electronic files for the plurality of different mobile device applications via the at least one wireless transceiver using a common file transfer application responsive to the download electronic file transfer requests. The steps may further include uploading requested electronic files for the plurality of different mobile device applications via the at least one wireless transceiver using the common file transfer application responsive to the upload electronic file transfer requests.

Still another non-transitory computer-readable medium may have computer-executable instructions for causing a mobile wireless communications device comprising a portable housing and at least one wireless transceiver carried by the portable housing to perform steps comprising receiving at least one file transfer filter via the at least one wireless transceiver from at least one wireless communications network, and operating a plurality of different mobile device applications for processing different electronic file types and generating download electronic file transfer requests. The steps may further include selectively downloading requested electronic files for the plurality of different mobile device applications via the at least one wireless transceiver using a common file transfer application responsive to the download electronic file transfer requests and based upon the at least one file transfer filter.

Figure 2:
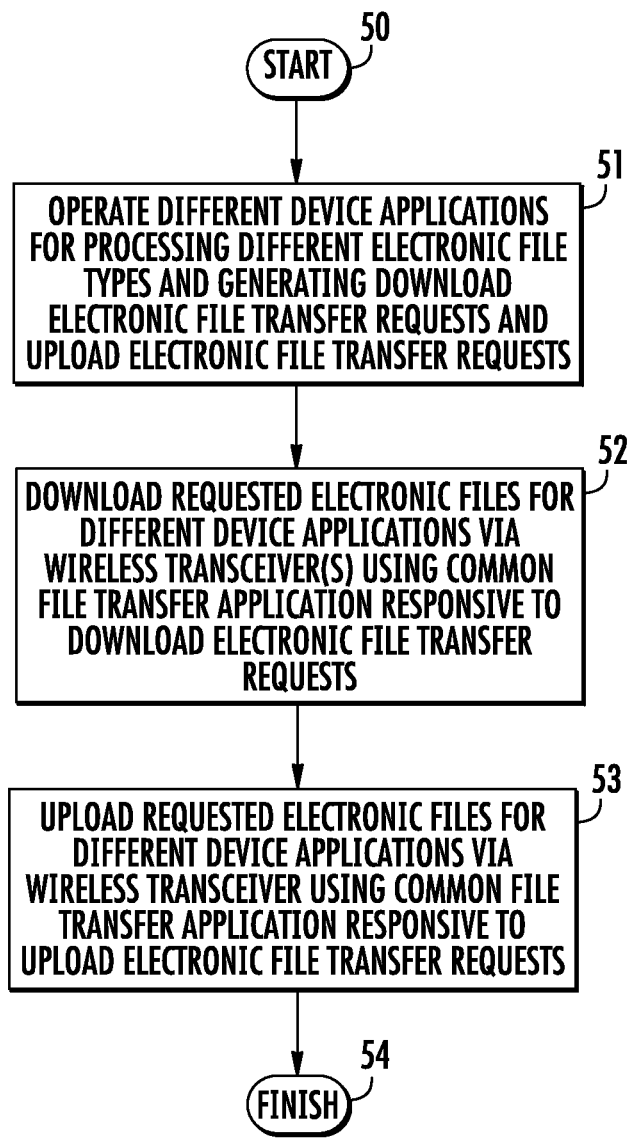
FIGS. 2 and 3 are flow diagrams illustrating method aspects associated with the system and mobile wireless communications device of FIG. 1.
Figure 3:
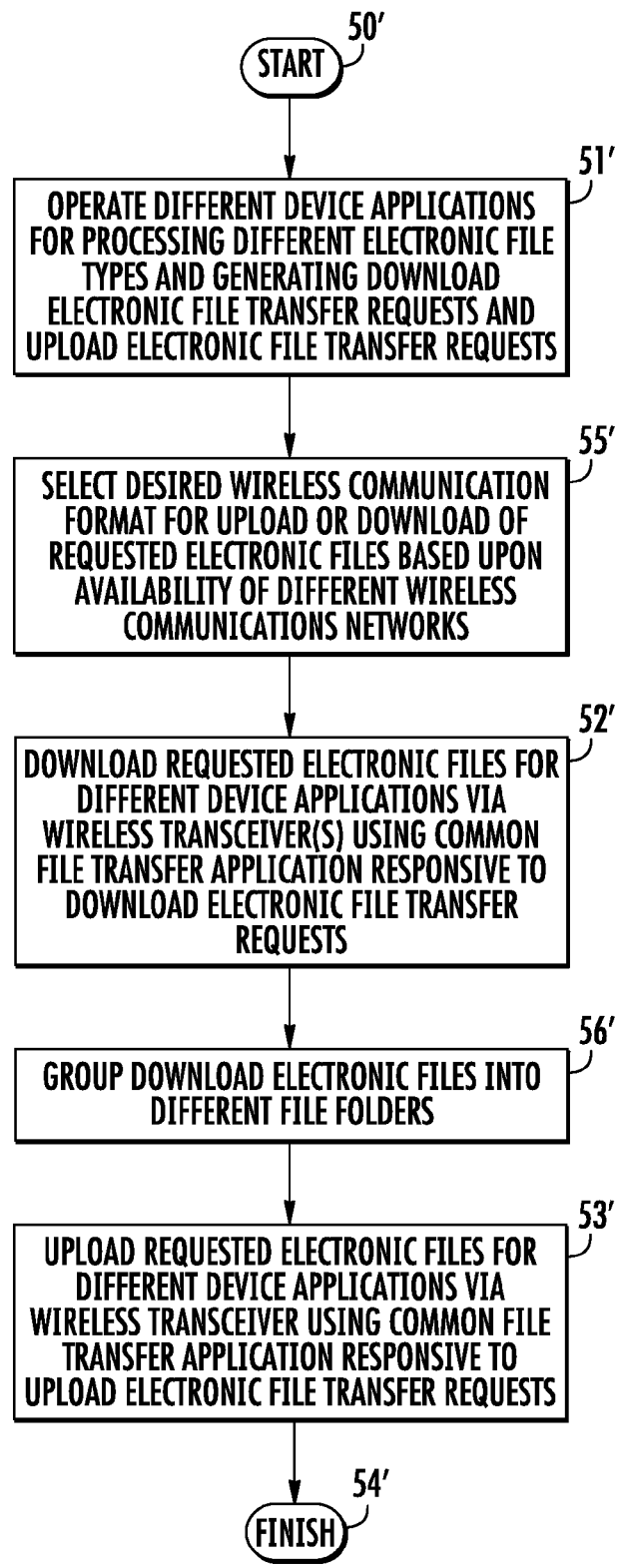

Referring initially to FIGS. 1 through 3, a communications system 28 illustratively includes mobile wireless communications device 30 (also referred to as a "mobile device" herein). The mobile device 30 illustratively includes a portable housing 31, one or more wireless transceivers 32 (e.g., cellular, wireless local area network (WLAN), WiMAX, etc.) carried by the portable housing, and a controller 33 carried by the portable housing and coupled to the wireless transceiver. The controller 33 may be configured to operate a plurality of different mobile device applications for processing different electronic file types, and generating download electronic file transfer requests and upload electronic file transfer requests. At the time of the download request, a suggested/mapped destination for the inbound file may be provided based upon default settings with respect to the file types (e.g., a JPG file may default to a pictures folder), along with an option to change the default file save location if desired. The controller 33 may also restrict or lock the ability to change the file storage location in some embodiments, if desired (e.g., certain files may need to be located in certain folders for different applications to operate properly, etc.).

The controller 33 may be implemented using a combination of hardware and software components, such as a microprocessor, computer-readable instructions on a non-transitory computer readable medium (e.g., memory), etc. Example mobile devices may include portable or personal media players (e.g., MP3 players, video players, etc.), portable gaming devices, portable or mobile telephones, smartphones, etc.

Beginning at Blocks 50, 50', the controller 33 operates different mobile device applications, at Blocks 51, 51'. In the present example, an electronic mail (email) application (represented by an email icon 34 on a display 35 of the mobile device 30), a picture (image) application (as represented by a camera icon 36), and a video application (as represented by a video camera icon 37) are provided. However, numerous other types of mobile device applications may also be operated or run by the controller 33. The exemplary applications may generate download or upload electronic file requests to download or upload various types of electronic files via the wireless transceiver 32 over a wireless communications network (e.g., cellular, WiFi, WiMAX, etc.) from or to a server 39, which is illustratively represented by a broadcast tower 38 in FIG. 1. For example, the image and video application may download or upload image files and video files from or to various Internet sites. The email application may download or upload electronic files from an email server, such as electronic document files (e.g., word processing, spreadsheet, PDF, etc.), as well as media files such as images, audio, or videos. Moreover, the controller 33 may also operate an application manager program, which allows other mobile device applications to be downloaded for operation on the mobile device 30.

Typically these various electronic files are grouped and stored in different folders or directories in device memory (see Block 56', FIG. 3). Thus, with numerous download and upload file operations, it may become difficult to determine the status or history of these operations across numerous file storage folders, or to otherwise locate where files have been saved. The controller 33 may advantageously download requested electronic files for the different mobile device applications via the wireless transceiver 32 using a common file transfer application responsive to the download electronic file transfer requests, at Blocks 52, 52'. That is, the common file transfer application serves as a central or single file transfer manager. This allows different mobile application developers to use a uniform set of procedures or routines to call for downloading (or uploading), without having to develop a respective file transfer application for each mobile application. Moreover, this provides users with a centralized place to check the status and history of file transfers. Thus, for example, users may monitor file download progress so that a failed download attempt may be re-started, or open a downloaded file without having to navigate though a long list of file folders to determine or access the desired file location.

Similarly, in some embodiments the controller 33 may also upload requested electronic files for the plurality of different device applications via the wireless transceiver 32 using the common file transfer application responsive to the upload electronic file transfer requests, at Blocks 53, 53', which concludes the method illustrated in Blocks 54, 54' (although in an actual implementation the foregoing steps may be repeated). For file uploads, user authentication to a server, etc., is sometimes required. In such instances, the common file transfer application may perform the authentication operations based upon stored or user-provided security credentials (e.g., username, password, etc.). In other instances, such authentication operations may be handled by the given mobile device application requesting the file upload, and the common file transfer application may cooperate with this application to perform the requested upload upon completion of authentication.

Referring additionally to FIG. 3, where a plurality of wireless transceivers are incorporated in the mobile device 32 that are configured to communicate using respective different wireless communication formats over different wireless communications networks (e.g., cellular, WiFi, WiMAX, etc.), it will be understood that different wireless mediums typically have different communication bandwidths associated therewith. For example, WiFi (e.g., 802.11x) generally has a much higher bandwidth than cellular communications. As such, the controller 33 may be configured to select a desired wireless communication format for upload or download of requested electronic files based upon availability of the different wireless communications networks, at Block 55'. That is, the controller 33 may select a "best available" format for upload or download, not only to expedite file transfer but also to potentially avoid wireless charges for excessive data transfer.

Stated alternatively, the common file transfer application may leverage the appropriate wireless medium (i.e., transport) based upon availability (e.g., USB, WiFi, cellular, etc.). In those cases where a given file type, etc. is prohibited from being transferred over a given medium (e.g., cellular), as will be discussed further below, the request may be parked in a queue. When an appropriate alternative transport medium (e.g., wired or WiFi connection) becomes available, the common file transfer application may then advantageously queue the request and initiate the upload or download automatically.

Figure 4:
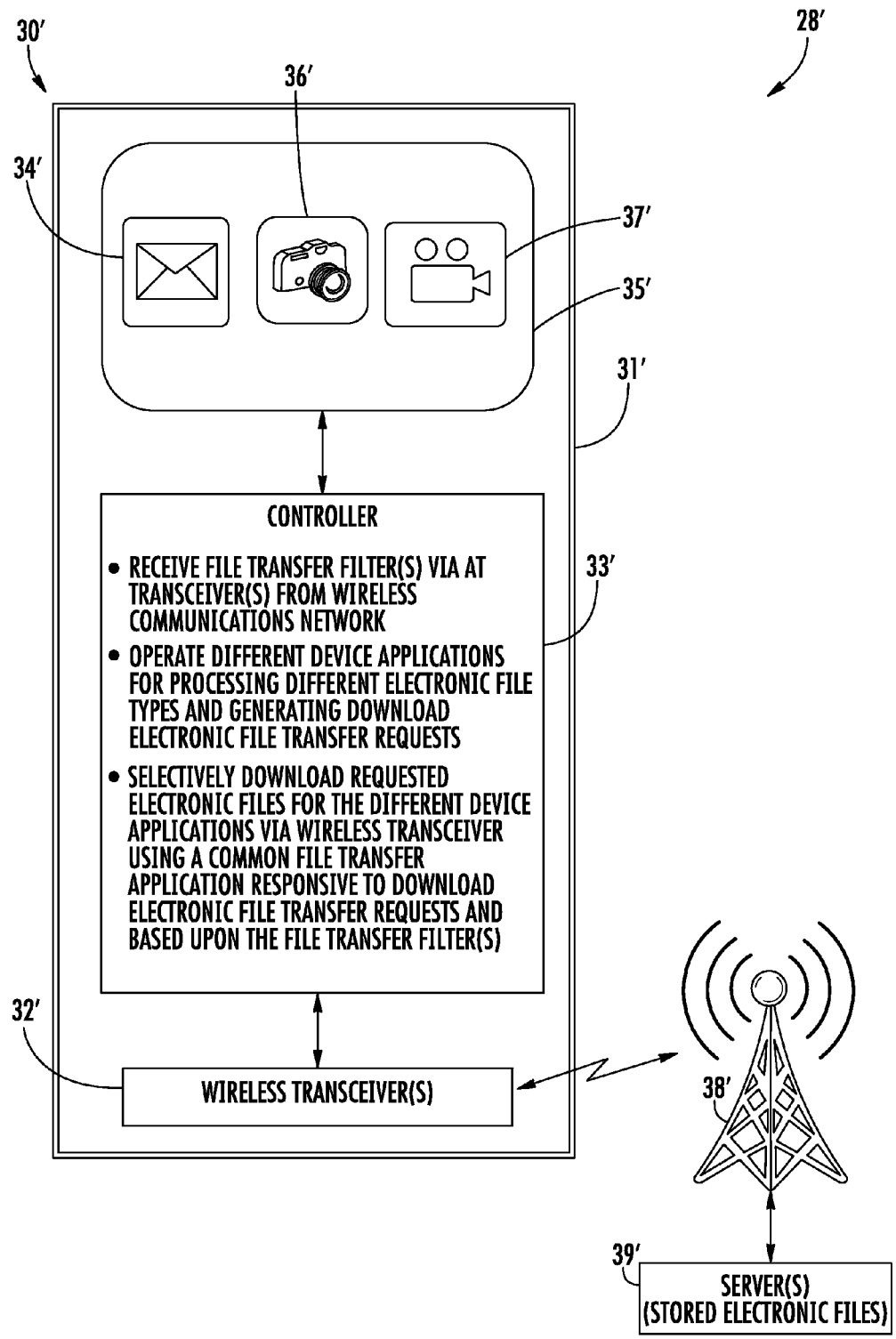
FIG. 4 is a schematic block diagram of an alternative embodiment of the system of FIG. 1.
Figure 5:
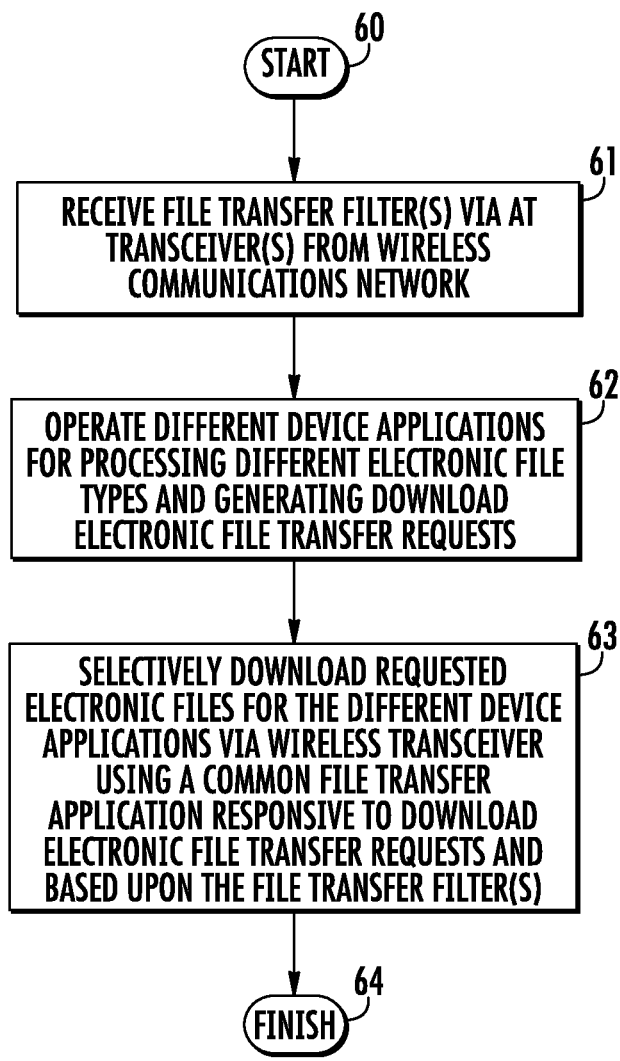
FIG. 5 is a flow diagram illustrating method aspects associated with the system and mobile wireless communications device of FIG. 4.

Referring additionally to FIGS. 4 and 5, in accordance with another exemplary embodiment the controller 33' may be configured to receive one or more file transfer filters via the wireless transceiver 32' from a wireless communications network, at Blocks 60-61. For example, in the case of a cellular network, the carrier may restrict the transmission of certain file types or sizes based upon file transfer filters. Thus, as the various mobile applications generate electronic download (or upload) file transfer requests, at Block 62, the controller 33' may selectively download (or upload) requested electronic files responsive to the requests, but based upon the file transfer filters, at Block 63, thus concluding the method illustrated in FIG. 5. That is, the controller 33' may use the filters provided by the carrier, or other filters which may be set by the user or application developer, for example, to prohibit upload or download of requested electronic files if these files do not comply with the filter rules (e.g., they are of a prohibited file type, they exceed a size threshold, etc.).

In accordance with one exemplary implementation, a baseline of transport filters (e.g., rules or restrictions) may be carrier-configurable, with some additional controls optionally given to mobile device applications. The additional controls may be more restrictive than the baseline carrier settings, although it may be desirable that the controls are not less restrictive or able to circumvent the intent of the carrier filter.

Exemplary components that may be used in various embodiments of the above-described mobile wireless communications device are now described with reference to an exemplary mobile wireless communications device 1000 shown in FIG. 6. The device 1000 illustratively includes a housing 1200, a keypad or keyboard 1400 and an output device 1600. The output device shown is a display 1600, which may comprise a full graphic LCD. In some embodiments, display 1600 may comprise a touch-sensitive input and output device. Other types of output devices may alternatively be utilized. A processing device or microprocessor 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 6:
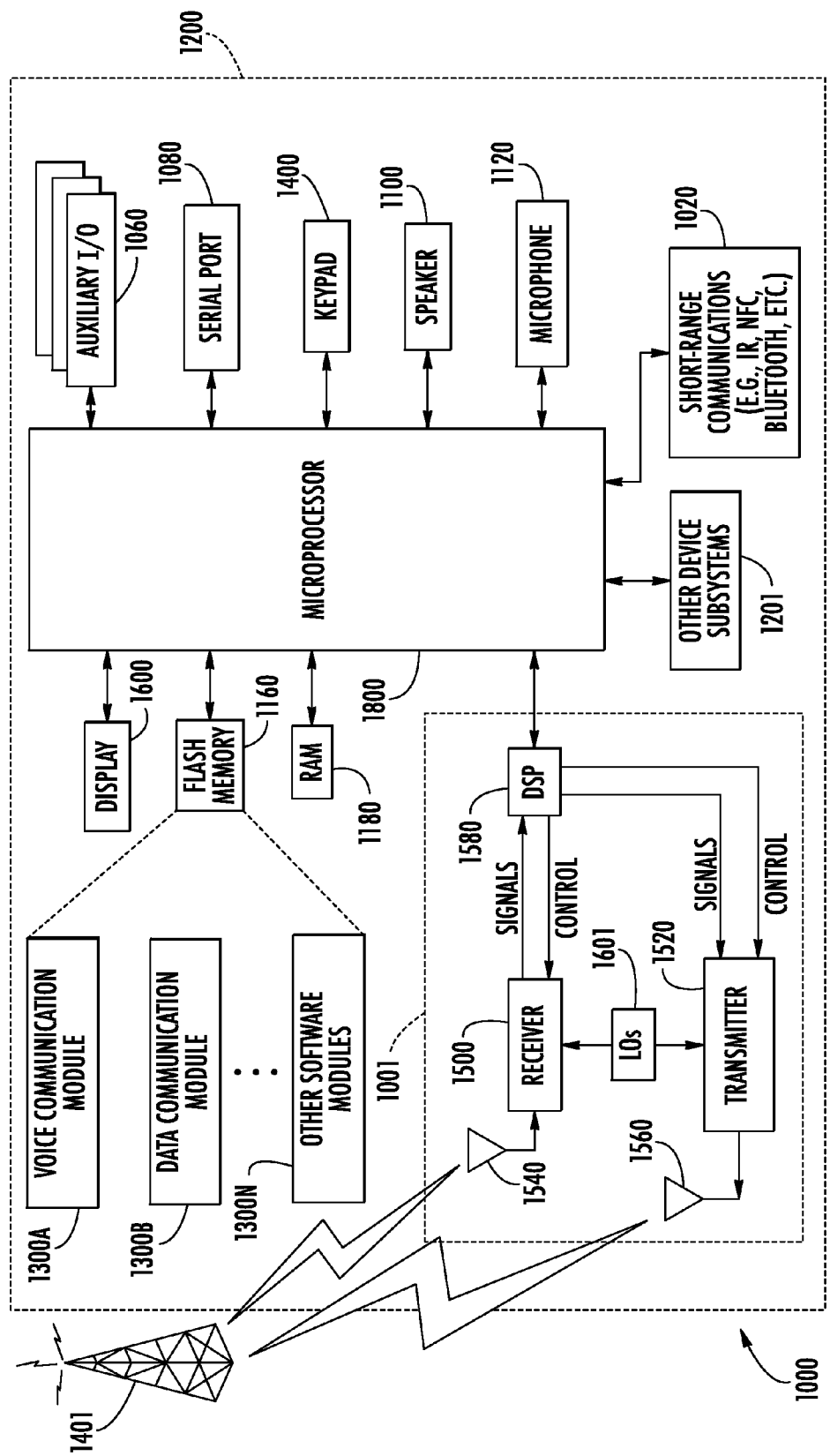
FIG. 6 is a schematic block diagram illustrating additional components that may be included in the exemplary mobile wireless communications devices of FIGS. 1 and 4.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as voice and data communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communications system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to the speaker 1100, and signals for transmission are generated by the microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

As noted above, the systems, devices, and methods described herein may advantageously download requested electronic files for the different mobile device applications via the wireless transceiver 32 using a common file transfer application responsive to the download electronic file transfer requests. That is, the common file transfer application serves as a central or single file transfer manager. This allows different mobile application developers to use a uniform set of procedures or routines to call for downloading (or uploading), without having to develop a respective file transfer application for each mobile application. Moreover, this provides users with a centralized place to check the status and history of file transfers. Thus, for example, users may monitor file download progress so that a failed download attempt may be re-started, or open a downloaded file without having to navigate though a long list of file folders to determine or access the desired file location.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:
   at least one wireless transceiver; and
   a controller coupled to the at least one wireless transceiver, the controller configured to
      operate a plurality of mobile device applications for processing electronic files and generating download electronic file transfer requests and upload electronic file transfer requests, and operate a file transfer application on the mobile wireless communications device,
      download requested electronic files for the plurality of mobile device applications via the at least one wireless transceiver using the file transfer application responsive to the download electronic file transfer requests, and
      upload requested electronic files for the plurality of mobile device applications via the at least one wireless transceiver using the file transfer application responsive to the upload electronic file transfer requests.

2. The mobile wireless communications device of claim 1 wherein the controller is further configured to receive at least one file transfer filter via the at least one wireless transceiver from at least one wireless communications network, and prohibit at least one of upload or download of requested electronic files based upon the at least one file transfer filter.

3. The mobile wireless communications device of claim 1 wherein the controller is further configured to group downloaded electronic files into different file folders.

4. The mobile wireless communications device of claim 1 wherein the at least one wireless transceiver comprises a plurality thereof configured to communicate using respective different wireless communication formats over different wireless communications networks having different communication bandwidths associated therewith; and wherein the controller is configured to select a desired wireless communication format for at least one of upload and download of requested electronic files based upon availability of the different wireless communications networks.

5. The mobile wireless communications device of claim 1 further comprising a display coupled to the controller.

6. A method for using a mobile wireless communications device comprising:
   operating a plurality of mobile device applications for processing different electronic files and generating download electronic file transfer requests and upload electronic file transfer requests, and operating a file transfer application on the mobile wireless communications device;
   downloading requested electronic files for the plurality of mobile device applications via at least one wireless transceiver using the file transfer application responsive to the download electronic file transfer requests; and
   uploading requested electronic files for the plurality of different mobile device applications via the at least one wireless transceiver using the file transfer application responsive to the upload electronic file transfer requests.

7. The method of claim 6 further comprising receiving at least one file transfer filter via the at least one wireless transceiver from at least one wireless communications network, and prohibiting at least one of upload and download of requested electronic files based upon the at least one file transfer filter.

8. The method of claim 6 further comprising grouping downloaded electronic files into different file folders.

9. The method of claim 6 wherein the at least one wireless transceiver comprises a plurality thereof configured to communicate using respective different wireless communication formats over different wireless communications networks having different communication bandwidths associated therewith; and further comprising selecting a desired wireless communication format for at least one of upload and download of requested electronic files based upon availability of the different wireless communications networks.

10. The method of claim 6 wherein operating, downloading, and uploading comprises using a controller and a memory coupled thereto to perform the operating, downloading, and uploading.

11. A communications system comprising:
   at least one server for storing electronic files; and
   at least one mobile wireless communications device comprising at least one wireless transceiver, and a controller coupled to the at least one wireless transceiver, the controller configured to
      operate a plurality of mobile device applications for processing electronic files and generating download electronic file transfer requests and upload electronic file transfer requests, and operate a file transfer application on the mobile wireless communications device,
      download requested electronic files for the plurality of mobile device applications from the at least one server via the at least one wireless transceiver using the file transfer application responsive to the download electronic file transfer requests, and
      upload requested electronic files for the plurality of mobile device applications to the at least one server via the at least one wireless transceiver using the file transfer application responsive to the upload electronic file transfer requests.

12. The communications system of claim 11 wherein the controller is further configured to receive at least one file transfer filter via the at least one wireless transceiver from at least one wireless communications network, and prohibit at least one of upload or download of requested electronic files based upon the at least one file transfer filter.

13. The communications system of claim 11 wherein the controller is further configured to group downloaded electronic files into different file folders.

14. The communications system of claim 11 wherein the at least one wireless transceiver comprises a plurality thereof configured to communicate using respective different wireless communication formats over different wireless communications networks having different communication bandwidths associated therewith; and wherein the controller is configured to select a desired wireless communication format for at least one of upload and download of requested electronic files based upon availability of the different wireless communications networks.

\* \* \* \* \*